UNITED STATES PATENT OFFICE.

MAX BUCHNER, OF MANNHEIM, GERMANY.

MANUFACTURE OF CERAMIC PRODUCTS.

SPECIFICATION forming part of Letters Patent No. 700,673, dated May 20, 1902.

Application filed April 24, 1901. Serial No. 57,264. (No specimens.)

*To all whom it may concern:*

Be it known that I, MAX BUCHNER, a citizen of the Empire of Germany, residing at Mannheim, in the Empire of Germany, have invented certain new and useful Improvements in the Manufacture of Ceramic Products; and I do hereby declare the following to be a full, clear, and exact description of the invention, such as will enable others skilled in the art to which it appertains to make and use the same.

This invention relates to the manufacture of ceramic products, and in particular to the preparation of earthenware products to be used for chemical purposes, such as diaphragms, cooling and condensing coils, and covering-tubes for pyrometers and a great variety of articles to be used in chemical and physical manipulations.

The object of the said invention is to prepare a mass or composition which will not undergo any appreciable shrinkage in volume or change of volume when subjected to changes of atmosphere and which will not be corroded or attacked by acids, alkalies, or other chemicals, which will offer great resistance to variations in temperatures, and which when used for diaphragms in electrolytic operations will combine the necessary amount of porosity with non-conductivity to electric currents.

With these objects in view my invention consists in the process, means, and features hereinafter described, and pointed out in the claims.

The property of all ceramic products heretofore made of changing their volume in firing or burning appears to be a very serious disadvantage in the industries wherever the object is to manufacture bodies having a definite size. The principal materials employed in the ceramic arts are quartzes and clays and in a minor degree feldspar and calc-spar. Quartz has the property of swelling in the fire, while clay in a pure condition shrinks. The swelling and shrinking depend on the degree of temperature and on the time during which the same acts. Mixtures of quartz and clay show the same property of changing their volumes according to the temperature and time during which they are being heated. An addition of feldspar or calc-spar, although shifting the relative proportions of shrinkage and expansion, does not under any condition eliminate the resultant shrinkage or swelling.

For example, a porcelain plate which has been fired once will have a different size from that which it assumes when exposed twice to the firing process or to the hardening-on process. Although it is not usual to expose porcelain products twice to the sharp fire or glazing-oven, such treatment is still frequently resorted to when it is necessary, for example, to repair a blemish in the glazing. This example has been cited merely to show that even a compact glazed ceramic mass will permanently change its volume according to the temperature and time during which it has been exposed to the same. This property involves a serious drawback in the arts when, for example, it is required to produce bodies having a determinate porosity, such as diaphragms. I have found in the course of my experiments in this field that aluminium oxid which has been previously melted or fused through natural or artificial agencies will not change its volume when subjected to repeated firing or heating to a high temperature. An example of aluminium oxid previously fused or melted or molten by natural agencies is corundum. Example of the same compound previously molten by artificial means is molten aluminium oxid prepared according to Goldschmidt's process. I have also found that this naturally or artificially molten aluminium may in the process of preparing ceramic products be combined with a certain proportion of other ingredients without appreciably affecting its quality of retaining a fixed volume when repeatedly fired.

My invention is based upon the practical utilization of the above discoveries.

In utilizing the above-described aluminium oxid for the preparation of ceramic products I proceed in substantially the same manner as employed in treating fire-clay or quartz. The aluminium oxid is employed in the condition of coarse or fine grains, according to the use to which the finished product is to be applied.

In using the aluminium oxid molten by artificial means I preferably use the product prepared according to Goldschmidt's process, as stated above, although aluminium oxid previously molten according to other methods may also be employed. The aluminium employed for the preparation of the molten oxid may contain certain impurities of iron oxid without any injurious results.

I will now describe my invention in detail by reciting two examples of what I consider the preferred mode of carrying out the said invention.

Example 1: A very good compact ceramic product free from cracks, which is particularly suitable for preparing such articles as are subjected to great differences or fluctuations of temperature, such as cooling-coils and covering-tubes for pyrometers, may be prepared according to the following directions: Sixty-four parts, by weight, of granular corundum which has been passed through a sieve sixty meshes to the square centimeter are mixed with twenty-seven parts, by weight, of Klingenberg clay, to which have been added nine parts, by weight, of fine corundum powder. Sufficient water to form a plastic mass is added to the whole, which is then thoroughly mixed, and the resultant mass is then suitably molded. When dry, the molded article is then fired or burned in the usual way and may be provided with a glazing.

Example 2: For the purpose of forming diaphragms for electrolytic purposes the following mixture is considered preferable: Two parts, by weight, of ground corundum or corundum powder is mixed with one part, by weight, of levigated kaolin and is treated as described in Example 1, then fired or burned. Diaphragms prepared according to this formula are exceedingly porous, but nevertheless only slightly permeable by liquids. They are very resistant against acids and in a marked degree against alkalies. In spite of considerable thickness they offer a remarkably low resistance to electricity. They are scratched by steel only with difficulty and are comparatively little sensitive to mechanical influences.

As already stated, it should be borne in mind that the gist of the invention lies in the previously-molten aluminium oxid (by natural or artificial agencies) which imparts to the new compound prepared according to my invention the property of maintaining a fixed volume when fired or subjected to heat or variations of temperature. The previously-molten aluminium oxid as discovered by me has the property of being insensitive to extreme changes in temperatures. With this property it combines the very valuable property of not being attacked by acids or alkalies. The above properties are also found in practically the same degree in compounds which contain such previously-molten aluminium oxid as the main ingredient and substantially in the proportions above stated. The shrinkage of such masses is extremely small and practically nil after having been subjected to a comparatively low temperature. After heating above such a temperature no further changes in volume take place and repeated heating has no influence whatever upon the volume of bodies or articles made therefrom.

What I claim, and desire to secure by Letters Patent of the United States, is—

1. The process of manufacturing ceramic products, which consists in combining previously-molten aluminium oxid with a plastic ceramic substance.

2. The process of manufacturing ceramic products for chemical purposes, which consists in mixing comminuted previously-melted aluminium oxid with comminuted plastic substances, such as kaolin.

3. The process of manufacturing ceramic products for chemical purposes, which consists in mixing comminuted previously-melted aluminium oxid with a plastic ceramic substance, such as kaolin, and adding to the whole the requisite amount of water.

4. The process of manufacturing ceramic products, which consists in mixing divided previously-melted aluminium oxid with a comminuted ceramic substance, such as kaolin, then adding the requisite amount of water and molding or forming the mixture into the required shapes.

5. The process of manufacturing ceramic products, which consists in mixing divided previously-melted aluminium oxid with a comminuted ceramic substance, such as kaolin, then adding the requisite amount of water and molding or forming the mixture into the required shapes and drying the mixture.

6. The process of manufacturing ceramic products, which consists in mixing divided previously-melted aluminium oxid with a comminuted ceramic substance, such as kaolin, then adding the requisite amount of water, molding or forming the mixture into the required shapes, drying and firing or burning the same.

7. The process of manufacturing ceramic products for chemical purposes, which consists in mixing together two parts by weight of comminuted previously-melted aluminium oxid with substantially one part by weight of divided kaolin and adding the requisite amount of water to form a plastic mass.

8. The process of manufacturing ceramic products for chemical purposes, which consists in mixing together two parts by weight of comminuted previously-melted aluminium oxid with substantially one part by weight of divided kaolin, adding the requisite amount of water to form a plastic mass and molding and drying the whole.

9. The process of manufacturing ceramic products for chemical purposes, which consists in mixing together two parts by weight of corundum powder with about one part by weight of levigated kaolin, adding the requisite amount of water, molding, drying and firing the mass.

10. As a new ceramic compound, previously-melted aluminium oxid mixed with a plastic ceramic substance, such as kaolin in the proportions substantially as hereinbefore set forth.

11. A new ceramic compound for chemical purposes consisting of corundum mixed with kaolin in the proportions substantially as hereinbefore set forth.

In testimony whereof I affix my signature in presence of two witnesses.

MAX BUCHNER.

Witnesses:
JACOB ADRIAN,
H. W. HARRIS.